United States Patent Office 2,701,211
Patented Feb. 1, 1955

2,701,211

PROCESS FOR PRODUCTION OF PIGMENTED FILM-FORMING MATERIALS

William Ivan Taylor and Selwyn George Hawtin, Spondon, near Derby, England, assignors to British Celanese Limited, a corporation of Great Britain No Drawing. Application March 8, 1950, Serial No. 148,518

Claims priority, application Great Britain March 17, 1949

10 Claims. (Cl. 106—198)

This invention relates to the production of water-insoluble film-forming substances pigmented with finely divided water-insoluble pigments.

White and coloured products of the above-mentioned character are useful for a variety of purposes, for example for conversion into white or coloured fibres, foils or the like, or for the pigmenting of unpigmented water-insoluble film-forming material, e. g. in the form of solutions, which may then be used for like purposes. The pigments available include a wide range of inorganic and organic products, white and coloured, for example vat dyes, water-insoluble azo dyes, and metallic lakes of water-soluble dyes. For satisfactory results the pigments must be in finely divided form and they may be brought into this form either before, during or after incorporation with the water-insoluble film-forming material. Quite frequently reduction of particle size of the pigments is advantageously effected at two or more of these stages. In practice it is usually found convenient to start with the pigment in as finely divided a form as possible.

Commercial finely divided pigments, whether in dry, solid form or in the form of aqueous or other pastes, frequently contain water-soluble material, for example salts arising from the manufacture of the pigments or constituting additions made to ensure that the pigment particles do not agglomerate to larger particles during a drying operation or on storage. Commercial vat dyes need to be in finely divided form for all their normal uses and almost invariably contain water-soluble material in substantial proportion, e. g. to the extent of 20% or more of the solid content. In the case of pigmented water-insoluble film-forming products it is often highly desirable that water-soluble salts or other water-soluble material should be absent. This is particularly the case with pigmented products to be converted into foils or fibres after bringing them into solution. In the case of producing artificial fibres from such products, for instance, the presence of water-soluble salts is undesirable in that the stability of spinning is often adversely affected. Further, the salts may give rise to corrosion of the somewhat complicated plant involved in the spinning of such products and necessitate more frequent changing of filters and spinning jets than is the case when such salts are absent. At first sight the best answer to the problem would appear to be the removal of the salts from the pigments prior to the incorporation of the latter with the water-insoluble film-forming material. Unfortunately, it is very difficult, and often quite impracticable, to free the pigments from salts before incorporating them with the film-forming material. If the finely divided pigment is extracted with water to remove salts, one is left with the difficult problem of filtering or otherwise separating the washed product from the wash water without substantial loss of pigment. Such losses may be very serious and are greater the more finely divided is the pigment.

It has now been found that in the production of pigmented water-insoluble cellulose acetate from pigment products containing water-soluble salts, the latter can very satisfactorily be eliminated by subjecting the cellulose acetate to an aqueous extraction after the intimate incorporation of the pigment. Not only is this extraction operation effective for the purpose indicated, but it may be carried out without appreciable loss of pigment. The new process is of particular value in the case of preparing coloured pigmented cellulose acetate substantially to be converted into textile fibres or foils. For the extraction with water or other aqueous liquid, the pigmented material may be in sheet form, for example small pieces of sheet up to six inches square or so and of a thickness from 0.01 to 0.05 inch. It may also be in other forms, e. g. as short rods. Preferably the material is in in such form that no point therein is more than about 0.05 inch from a surface thereof. Cold or hot water may be used for example. Thus, one may use several changes of cold water allowed to act during a period of say one to three days, or hot water, for instance boiling water, for shorter periods may be employed, for example one to four hours. The time required to effect extraction of water-soluble salts in this manner depends also upon the thickness of the pigmented material. The washed material may then be dried, for example by means of hot air.

The invention is not limited to the use of water alone for extracting the salt from the pigmented material. Thus there may be used water containing a proportion of a water-miscible organic liquid which is capable of swelling the cellulose acetate. Such water-miscible organic liquid may be ethyl, methyl or propyl alcohol or acetone.

The intimate incorporation of the pigment with the cellulose acetate may have been effected in any convenient manner. Thus, the pigment may have been mixed with a solution of the cellulose acetate and the whole precipitated with water or other suitable non-solvent for the cellulose acetate. Preferably, the incorporation of the pigment with the cellulose acetate is combined with a treatment adapted to break up and/or thoroughly disperse the pigment particles. One method is to mill the pigment with a solution of the cellulose acetate in a suitable solvent. It is preferred, however, to effect dispersion and reduction in the size of the pigment particles by kneading, rolling or otherwise mechanically working a mixture of the pigment, cellulose acetate, and a softening agent for the latter, preferably a volatile water-soluble softening agent, for example in the manner described in U. S. Patent No. 2,048,248. The kneading, rolling or the like should be, in part at least, effected while the proportion of softening agent does not exceed that required to ensure that the mixture is a stiff dough. The softening agent may be an easily volatile solvent, such as acetone, or a less volatile solvent, e. g. one of boiling point 120° to 180° C., such as glycol monomethyl or monoethyl ether, diacetone alcohol, glycol-monomethyl ether acetate, or ethyl lactate.

The kneading, rolling or other working may be carried out while evaporating solvent from the mixture of pigment, cellulose acetate and solvent: thus it may be carried out on heated malaxating rolls. Adjacent co-acting rolls may be run at the same peripheral speed or at different peripheral speeds. For example, cellulose acetate, pigment and acetone or diacetone alcohol may be formed into a dough using say 30 to 150 per cent. of the solvent based on the weight of the cellulose acetate, and the dough worked on hot rolls in the manner indicated above until substantially no solvent remains. This working results in exceedingly intimate incorporation of pigment with the cellulose acetate and, at the same time, breaks up the particles of pigment. If the pigment is used as an aqueous paste, it is preferred to use the higher-boiling softening agents referred to above so that a preferential volatilisation of solvent during working does not lead to such high water content of the material on the rolls as to prevent it adhering to the latter. If desired some or all of the water may be evaporated from the mixture before the working operation is commenced. The presence of some water, at least during the initial mixing of pigment and film-forming material, seems to be an advantage, but a high proportion is undesirable during the working operation referred to above.

If the proportion of water is undesirably high, as for example when the pigment has been employed in the form of an aqueous paste, it is often useful to add a low-boiling water-miscible solvent such as acetone as well as high-boiling solvent so as to ensure solution of the cellulose acetate, and thereafter to evaporate the low-boiling solvent and water and then to work the residue on hot rolls. The low-boiling solvent may, for example, be removed from the product in a suitable steam-heated vessel provided with means for recovery of the evaporated solvent, and the residual product then dried on hot plates to remove water without substantial loss of the higher-boiling solvent, such as diacetone alcohol, which may advantageously be present at this stage in a proportion of 30% to 80% based on the weight of the cellulose acetate. The remaining product can then be worked on hot rolls, as indicated above, and extracted with water. After the working operation the material is in a very compact form as compared, for instance, with the fibrous or powder form of cellulose acetate as ordinarily manufactured. The addition of some low-boiling solvent is also convenient when the cellulose acetate used for the preparation of the product is in a very bulky form, as in the case of waste cellulose acetate fibres.

The evaporation of the acetone or other low-boiling solvent from the cellulose acetate solution containing pigment, water, acetone or other low-boiling solvent, and diacetone alcohol or other high-boiling solvent as described above, may result in precipitation of the cellulose acetate intimately intermingled with pigment. This precipitation is an advantage in that the remaining acetone is more readily removed than if no precipitation occurs. If desired, water may be added to th cellulose acetate solution prior to evaporation of acetone in order to ensure precipitation at this stage and this expedient is valuable whether or no the solution already contains water. Thus the process of the invention may be conducted by forming a composition consisting of a dispersion of the salt-containing pigment in a solution of cellulose acetate in a mixture of acetone or other low-boiling solvent and diacetone alcohol or other high-boiling solvent, adding sufficient water to precipitate the cellulose acetate, evaporating off the acetone and most or all of the water while retaining the major part of the diacetone alcohol, and mechanically working the residue while evaporating the diacetone alcohol or other high-boiling solvent, in the manner hereinbefore indicated.

The extraction with water not only removes salts but also residal water-soluble softening agent such as diacetone alcohol.

The proportion of pigment in the products may be high, for example from 15 to 35 per cent of the combined weight of pigment and film-forming material. Such highly pigmented products are very convenient for incorporation with uncoloured material. By preparing very highly concentrated pigmented material, extracting the salts therefrom and using this concentrated product to colour a much larger bulk of uncoloured material for conversion into artificial fibres, a considerable saving is effected by reason of the smaller bulk of material which need be handled during the incorporation of the pigment and the extraction of salts from the pigmented product.

The new process may be applied to products prepared with a wide range of white or coloured pigments. However, it is of particular value in the case of using vat dyes as the pigments since these valuable products are rarely available in finely divided form except as products containing water-soluble salts. Mixtures of pigments may, of course, be used, including mixtures of vat dyes with pigments of other kinds, for example carbon black or water-insoluble azo dyes.

The invention is illustrated by the following examples, the "parts" referred to being parts by weight.

*Example I*

50 parts of cellulose acetate are mixed with 12.5 parts of commercial vat dye in powder form, for example Caledon Blue RN, 25 parts of diacetone alcohol and 12.5 parts of water. The resulting dough is then worked on rolls at a temperature of about 65–75° C. until the water and the diacetone alcohol are substantially evaporated. The product is taken off the rolls as a thin sheet e. g. of about 1/32 inch thickness, and when cold is broken up into pieces about six inches square. It is then boiled with hot water for two hours and is thereafter dried in a current of hot air and broken up into pieces about a quarter of an inch square. In this form it is convenient for colouring cellulose acetate spinning solution by incorporation with the requisite additional cellulose acetate together with acetone.

*Example II*

10 parts of waste cellulose acetate yarn are mixed with about 23 parts of vat dye paste containing about 10 per cent of dye, e. g. Caledon Brilliant Red 3BS paste, 16.5 pounds of acetone and 6.7 pounds of diacetone alcohol. The mixture is stirred in a steam jacketed vessel so as to boil off the acetone. The water present results in precipitation of cellulose acetate at this stage. Most of the water is also boiled off and the mixture is then heated on a hot-plate until the water content is reduced to below about 10 per cent, most of the diacetone alcohol remaining at this stage. The product is then worked on hot rolls, broken up and extracted with water in the manner described in Example I. The result is a product which can be used for the colouring of cellulose acetate spinning solutions so as to give solutions exhibiting extremely good spinning stability.

*Example III*

Acetone solution of cellulose acetate of 26% strength by weight (23 lbs.), salt-containing vat dye powder (1½ lbs.), and diacetone alcohol 4 lbs., are thoroughly mixed and 20 lbs. of water added, while stirring, to precipitate the cellulose acetate. Stirring is continued while heating to evaporate off the acetone and most of the water. The residue is then heated on a hot-plate until the water content is reduced below about 10%, most of the diacetone alcohol remaining at this stage. The product is then worked on hot rolls, and broken up and extracted with water in the manner described in Example I. The extracted product can be used for the production of coloured cellulose acetate spinning solutions by incorporation with the requisite additional cellulose acetate together with acetone.

Other commercial vat dyes may be substituted for the vat dyes referred to in the above examples.

According to a modification of the invention, to obtain pigmented products of other film-forming materials, the cellulose acetate in the foregoing process is replaced by another water-insoluble thermoplastic film-forming substance having a water-imbibition in the range of from about 10% to about 40%, and especially in the range of from about 20% to about 40%. By the term "water-imbibition" is meant the proportion of water taken up internally by the material, when soaked in water at 20° C., over and above that present in the material after the latter has been conditioned in air of 65% R. H. at 20° C. It may conveniently be determined experimentally by thoroughly soaking in water a weighed portion of the material in sheet or fibre form, and conditioned as above, freeing the material from external water by passing between sheets of blotting paper, and reweighing. The increase in weight, calculated as a percentage of the weight of the conditioned material, is the percentage water-imbibition.

The process may be applied for instance, in the pigmenting of other water-insoluble thermoplastic film-forming substances having the aforesaid degree of water-imbibition, for example a cellulose ester or ether of this character, e. g. cellulose propionate, cellulose aceto-propionate, or cellulose aceto-butyrate. Again, it may be a polyamide of this character, for example a polyurethane or a polyamide obtainable by condensing a dicarboxylic acid with a diamine, e. g. a polyamide obtainable by heating adipic acid with hexamethylene diamine. Further it may be a polyvinyl compound of the aforesaid character, for example polyvinyl acetate, or a co-polymer of vinyl chloride with vinyl acetate or acrylonitrile.

Having described our invention, what we desire to secure by Letters Patent is:

1. Process for the production of a pigmented water-insoluble film-forming substance substantially devoid of water-soluble salts and suitable for spinning into artificial filaments, from a pigmented preparation containing water-soluble salts, which comprises forming a dough from the salt-containing pigment, a water-insoluble film-forming material having a water imbibition of from about 10% to about 40% at 20° C. and a volatile softening agent for the latter, mechanically working the dough, while evaporating the softening agent to disperse the pigment finely throughout the dough and to break up the pigment particles, continuing the working and evaporation of the softening agent until the latter is substantially all removed and a solid compact intimate mixture of said pigment and said filament-forming material is obtained, and subjecting the solid compact mixture, in such form that no point therein is more than about 0.05 inches from a surface thereof, to an aqueous extraction until the water-soluble salts have been substantially removed.

2. Process for the production of a pigmented water-insoluble film-forming substance substantially devoid of water-soluble salts and suitable for spinning into artificial filaments, from a pigmented preparation containing water-soluble salts, which comprises forming a dough from the salt-containing pigment, a water-insoluble film-forming material having a water imbibition of from about 20% to about 40% at 20° C. and a volatile softening agent for the latter, mechanically working the dough, while evaporating the softening agent to disperse the pigment finely throughout the dough and to break up the pigment particles, continuing the working and evaporation of the softening agent until the latter is substantially all removed and a solid compact intimate mixture of said pigment and said filament-forming material is obtained, and subjecting the solid compact mixture, in such form that no point therein is more than about 0.05 inches from a surface thereof, to an aqueous extraction until the water-soluble salts have been substantially removed.

3. Process for the production of a pigmented cellulose acetate product suitable for the production of coloured cellulose acetate spinning solutions by mixing with solvent and more cellulose acetate and substantially devoid of water-soluble salts, from a pigment preparation containing water-soluble salts, which comprises forming a dough of cellulose acetate, the salt-containing pigment and a volatile solvent for cellulose acetate, mechanically working the dough, while evaporating solvent, to disperse the pigment finely throughout the dough and to break up the pigment particles, continuing the working and evaporation of solvent until the latter is substantially all removed and a solid compact intimate mixture of said cellulose acetate and said pigment is obtained, and subjecting the product, in the form of a sheet in which no point therein is more than about 0.05 inches from a surface thereof, to aqueous extraction until the water-soluble salts have been substantially removed.

4. Process according to claim 3, wherein extraction is effected with hot water.

5. Process according to claim 3, wherein the volatile solvent has a boiling point of 120° to 180° C.

6. Process according to claim 3, wherein the volatile solvent has a boiling point of 120° to 180° C., is miscible with water, and is used in conjunction with water.

7. Process according to claim 6, wherein the volatile solvent is diacetone alcohol.

8. Process for the production of a pigmented cellulose acetate product suitable for the production of coloured cellulose acetate spinning solutions by mixing with solvent and more cellulose acetate and substantially devoid of water-soluble salts, from cellulose acetate and an aqueous pigment paste containing water-soluble salts, which comprises mixing the dye paste and cellulose acetate with sufficient acetone and diacetone alcohol to bring the cellulose acetate into solution, evaporating off acetone and water until the water content is below about 10%, while retaining the major part of the diacetone alcohol, mechanically working the product as a dough, while evaporating residual solvent, to disperse the pigment finely throughout the dough and to break up the pigment particles, continuing the working and evaporation of solvent until the latter is substantially all removed and a solid compact intimate mixture of said cellulose acetate and said pigment is obtained, and subjecting the product, in the form of a sheet in which no point therein is more than about 0.05 inches from a surface thereof, to aqueous extraction until the water-soluble salts have been substantially removed.

9. Process according to claim 8, wherein the initial cellulose acetate is in the form of yarn waste.

10. Process for the production of a pigmented cellulose acetate product suitable for the production of colored cellulose acetate spinning solutions by mixing with solvent and more cellulose acetate and substantially devoid of water-soluble salts, from cellulose acetate and a pigment preparation containing water-soluble salts, which comprises forming a composition consisting of a dispersion of the salt-containing pigment in a solution of cellulose acetate in a mixture of acetone and diacetone alcohol, stirring in sufficient water to precipitate the cellulose acetate, evaporating off the acetone and the water until the water content is below about 10% while retaining the major part of the diacetone alcohol, mechanically working the product as a dough, while evaporating residual solvent, to disperse the pigment finely throughout the dough and to break up the pigment particles, continuing the working and evaporation of solvent until the latter is substantially all removed and a solid compact intimate mixture of said cellulose acetate and said pigment is obtained, and subjecting the product, in the form of a sheet in which no point therein is more than about 0.05 inches from a surface thereof, to aqueous extraction until the water-soluble salts have been substantially removed.

References Cited in the file of this patent

UNITED STATES PATENTS

| 2,490,178 | Van der Kroon | Dec. 6, 1949 |

FOREIGN PATENTS

| 165,804 | Great Britain | July 11, 1921 |
| 285,829 | Great Britain | Dec. 6, 1928 |
| 354,696 | Great Britain | Feb. 7, 1930 |
| 413,262 | Great Britain | Oct. 6, 1932 |
| 575,570 | Germany | Apr. 29, 1933 |
| 619,148 | Germany | Sept. 23, 1935 |

OTHER REFERENCES

"Handbook of Plastics," Simonds and Ellis, second edition (1943), page 242.